United States Patent [19]

Samuels et al.

[11] 4,020,690
[45] May 3, 1977

[54] CRYOGENIC LIQUID LEVEL MEASURING APPARATUS AND PROBE THEREFOR

[76] Inventors: W. Edward Samuels, 402 W. Blackbeard Road, Wilmington, N.C. 28401; Robert J. Adler, 3068 Van Aken, Shaker Heights, Ohio 44120

[22] Filed: Sept. 22, 1975

[21] Appl. No.: 615,394

[52] U.S. Cl. .................................................. 73/299
[51] Int. Cl.² ............................................ G01L 7/00
[58] Field of Search ........................... 73/299, 302

[56] References Cited
UNITED STATES PATENTS

| | | | |
|---|---|---|---|
| 2,525,807 | 10/1950 | Lane et al. ........................ | 73/299 X |
| 3,031,887 | 5/1962 | Weisend ........................... | 73/299 X |
| 3,221,551 | 12/1965 | Hogan et al. ...................... | 73/299 |

*Primary Examiner*—Jerry W. Myracle
*Attorney, Agent, or Firm*—P. D. Golrick

[57] ABSTRACT

Liquid level in a vessel of cryogenic liquid of solid-liquid slurry is determined and indicated by sensing, in an immersed tubular probe, a probe-evoked vapor gas pressure counter balancing the hydrostatic head to the probe tip, and displaying an output on an appropriate meter scale or by a digital readout device in level height or other vessel-content terms, and, if desired, activating a low level alarm; the probe as a heat pipe conducting heat, from a source external of the liquid, to the probe bore as far as the tip to volatilize liquid entering the probe tip from which as a sensing gas the gas phase may slowly bubble; a differential pressure sensing device being connected to the probe and to the vessel gas space for a closed vessel.

The probe comprises a small-diameter copper sensing tube with bottom tip open to the liquid and top end connected to the pressure sensing device; and a sensing-tube-surrounding stainless steel tube as (at least at temperature of use) an insulating vacuum jacket, with certain structural expedients to accommodate differences in average thermal coefficients of linear expansion of the metals, to maintain the tubes generally coaxially spaced from contact under conditions, and to reduce heat transfer therebetween. Probe variations are given for use in the common method whereby liquid at the point of measurement will have a vapor pressure exceeding the static head.

30 Claims, 9 Drawing Figures

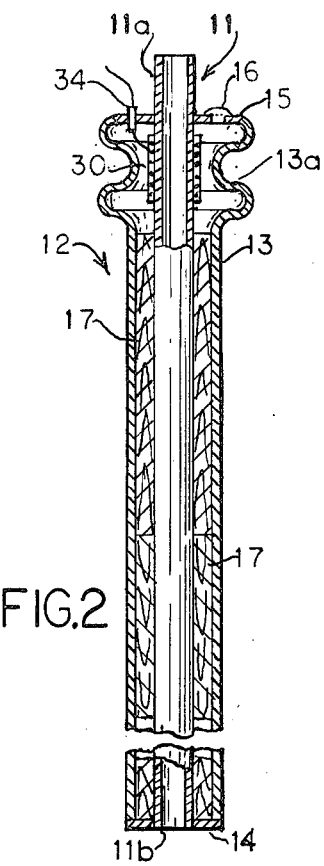
FIG. 2
FIG. 2A
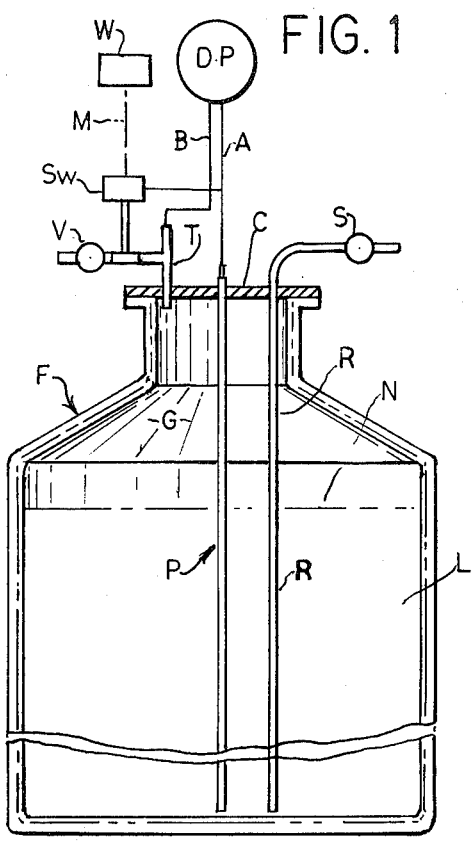
FIG. 1
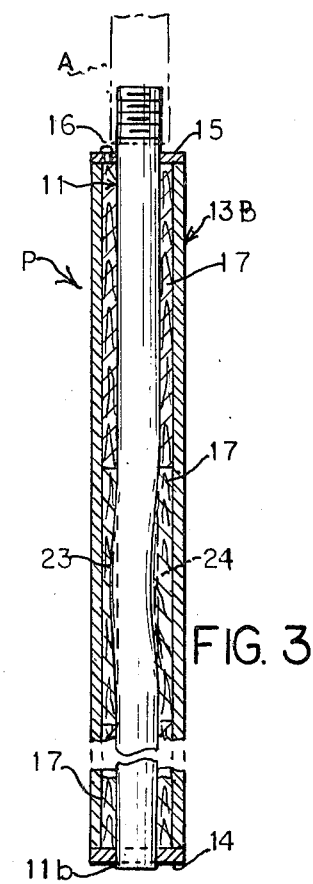
FIG. 3
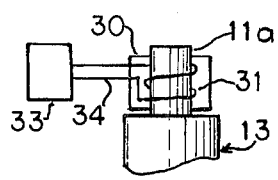
FIG. 4
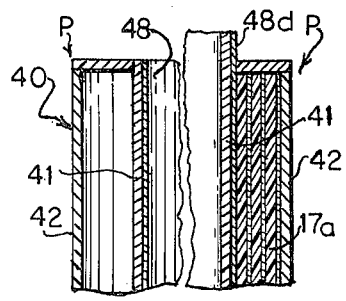
FIG. 6 - 6A
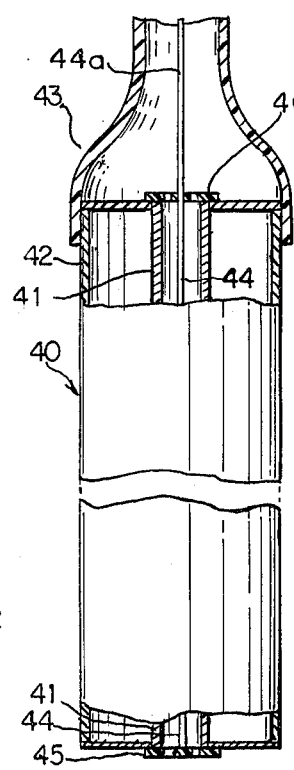
FIG. 5
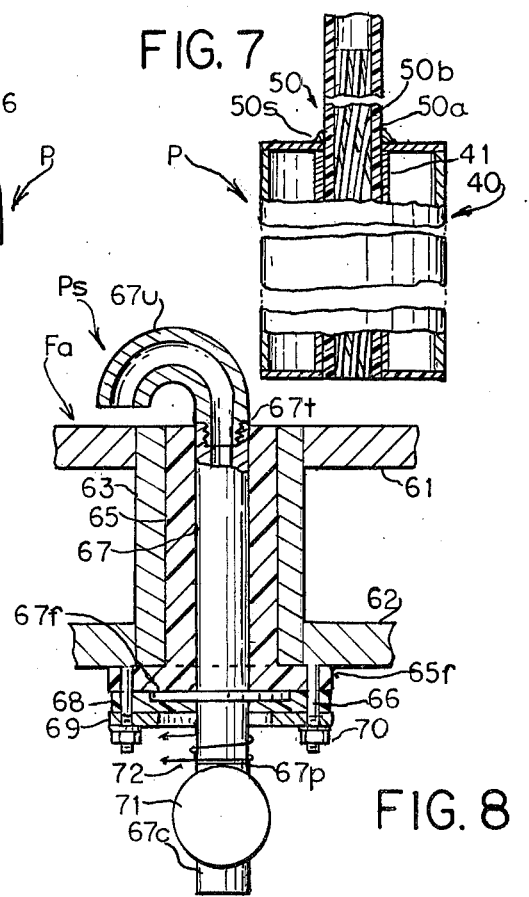
FIG. 7
FIG. 8

CRYOGENIC LIQUID LEVEL MEASURING APPARATUS AND PROBE THEREFOR

In the following descriptive specification, the present invention will be described in the environment of, or with respect to measurement of the height of the level of, a cryogenic liquid, particularly liquid nitrogen, contained in a Dewar flask closed against the atmosphere; but it is to be understood that the invention has application for other liquids, and cryogenic liquid - solid slurries (hereinafter also comprehended in the term "liquids"), also to liquid level measurement in a more wasteful container wherein the liquid level is exposed to ambient atmosphere and pressure. In addition to application for such liquified gases as nitrogen, oxygen, hydrogen and helium having widespread research and industrial applications, it is also useful to other volatile liquids, including various liquified gases, for example, liquified natural gas, among others which are liquified usually at low temperatures and at atmospheric or higher pressures, in some cases being in liquid phase at room temperatures under appropriate pressures. The conditions for storage and/or use of such various liquids, hence conditions under which levels are to be measured, of course depend on the critical constants of the substance in question.

Particularly, with respect to cryogenic liquids, usually comparatively costly substances, the measurement and/or indication of the liquid level prevailing in a storage or use vessel has been attended with various difficulties springing from the very nature of the substance and its properties in its liquid and/or gas phase; or from the consequent conditions which may be peculiarly involved for their use or storage. Often commonly known expedients, quite acceptable for the determination, observation and especially continuous indication of liquid level in a vessel of ordinary liquids, are either totally unacceptable in principle for cryogenic and similar liquids here of concern, or because they entail high cost in the equipment, or in the loss or consumption of the liquid in question, or unreliability in operation.

Thus sight glasses, or float devices and the like presenting a direct mechanical readout through motion linkages, usually are entirely unacceptable from safety considerations, pressure involved, or reliability because of temperatures or pressures of the environment.

Various conventional electrical or electronic systems, of simpler form and low cost, may be unacceptable from the viewpoint of safety with particular liquids and the gases resulting therefrom where there is an explosion or fire hazard. On the other hand, electronic devices which may be acceptable from the viewpoint of reliablity and safety have suffered the disadvantages of high cost or inherent dependence upon an external electrical power soure liable to failure by interruption or consumption.

On the other hand, certain proposals have been made to sense, measure and indicate liquid level based upon sensing of the gas pressure required to achieve bubbling of the gas from the end of a liquid-immersed probe, that is, to balance out or equivalate the hydrostatic head of the liquid above the probe tip.

In such systems thus far proposed it has been found that there are disadvantages in requiring an external gas source for probe operation; and further that the probe nonetheless is strangely unreliable, except at extremely high rates of gas consumption, or of liquid loss, because else in fact the gas used, usually necessarily of the same substance as that of the stored liquid, would condense within the probe, at least with deep probe immersion, hence giving misleading and erroneous level indications.

By the present invention, based upon the measurement of pressure in a probe balancing the hydrostatic head of the liquid, there is provided a quite simple system and means requiring no external gas source, in most cases operable by a small quantity of heat drawn from ambient atmosphere, and utilizing a small amount of the measured liquid. Though advantageously operable in conjunction with sensitive mechanical indicating pressure gauges, differential pressure gauges in some cases, of readily commercially available and commonly known types, certain aspects of the invention are advantageously utilized merely for a low level alarm, or in electronic systems where as the sensor there is used a pressure transducer (usually of an appropriate differential type), responding to pressure conditions by changes of some electrical parameter, especially where, for example, it may be desired to have a digital readout.

Simply put, the invention is based primarily upon the use of a novel head probe, comprising a tubular sensor element of copper or other thermally conductive material surrounded from its bottom sensing tip, i.e., substantially from its bottom end over its major length by means insulating it from the cryogenic liquid, particularly a vacuum jacket in the form of a stainless steel tube, extending from the probe tip upwardly over at least that portion of its length which will be immersed in the liquid at any time in the environment of use. Opposed surfaces of the jacket tube and central copper sensor tube are not only kept spaced out of contact, but preferably both are quite reflective, e.g., highly polished or plated, to minimize radiation therebetween. A certain area of the upper end of the sensor tube, projecting beyond the jacket, serves as a point of input heat transfer to the sensor tube.

As well, other structural expedients and material selection in character and dimension provide an effective heat pipe for conduction of heat around the effective pressure sensing bore to the tip of the probe, to ensure againt presence of the measured liquid in the bore by maintaining sufficient heat conduction for vaporization of liquid tending to enter the tube so that it is effectively filled with the gas phase to the tip (with occasional slow bubbling) and with assured prevention of condensation from the sensing gas to liquid phase within the tube.

An important advantage of the invention is that, in general, the heat input area of the projecting top end of the sensor tube may simply be exposed to the conditions of the ambient atmosphere, as the heat source; though in unusual situations may have another source such as an electrical resistance heater device.

Where the vessel is open to atmosphere, the "gauge" pressure in the probe may be sensed; where closed, the pressure differential between the probe-contained "sensing gas" and the gas phase space in the vessel. For a particular vessel, rather than mere level height above the probe tip, the readout device or indicator may be graduated, calibrated or designed to give information in terms of volume of liquid in the vessel.

The general object of the present invention is then to provide a liquid level sensing and/or indicating system, especially useful for vessels containing cryogenic liquids or similar volatile liquids.

A further object is the provision of a simple system including a simple probe for use in measuring levels of liquids of the type described by measurement of the gas pressure required to counterbalance the hydrostatic head of the liquid above the probe tip.

Other object and advantages will appear from the following description and the drawings wherein:

FIG. 1 is a generalized schematic view of a system incorporating the invention in a typical environment;

FIG. 2 is a longitudinal, fragmentary section of a first form of probe utilized in FIG. 1;

FIG. 2A shows an optional tip form;

FIG. 3 is a modification of the probe;

FIG. 4 is a schematic detail of a probe top end;

FIGS. 5, 6, 6A and 7 are fragmentary views, partially in section, presenting further probe forms;

FIG. 8 is another mode of application.

GENERAL ORGANIZATION

In the generalized representation of FIG. 1, showing one embodiment of the system and probe, the vessel F contains a volume of liquid nitrogen L, and with the vessel are associated a probe P and level response means DP for determining what of the total gas pressure, required in probe P to balance out the hydrostatic pressure, is the portion attributable to the liquid head above the probe bottom tip; and then indicating at least one level attained, for example by an alarm, or continually indicating these or displaying in appropriate terms the prevailing level or even volume of the vessel-contained liquid.

The vessel is schematically represented as an insulated Dewar flask, typically closed by a cover or stopper means C through which a liquid discharge riser tube R extends from the vessel bottom to terminate in an external line controlled by the supply discharge control valve S. Thus liquid is delivered under the vapor pressure of the nitrogen gas atmosphere in the gas space G above the liquid surface at liquid level N. The cover also is penetrated by the liquid level probe P for sensing the prevailing level height, and also has a Tee-fitting T with a safety relief valve V on one arm thereby put in communication with the gas space in the top of the vessel.

Also FIG. 1 shows low-level warning alarm means comprising a pressure responsive switch Sw connected to the Tee-fitting and to line A; and also connected by means M to a low-level alarm device W, warning by audible and/or visual alarm such as a bell and/or light when a certain low level is reached. For example, Sw may be a normally open low pressure switch switching upon pressure drop to a point corresponding to the level where warning is desired, and by conductors at M triggering electric components in W to indicate and warn of the low level. Switches adjustable to response at a preset point within a pressure range of say 1 to 5 inches of water are available. Either the alarm component group Sw-M-W, or the means DP as broadly described, or as shown, both may be used in association with the probe P for the vessel.

Other details of the typical vessel, of the cover, and means for securing the cover and sealing the probe P, riser R, and fitting T relative to the cover and pressure tap lines in a gas-tight manner, being conventional, are not shown or discussed in detail.

The said gas space and the gas therein will both be referred to by the letter G. The reference letter N will be used to designate the surface of the liquid phase, as well as its level, and "level" will be used to signify also the height of the surface above the probe tip.

Since the vessel is here assumed closed to atmosphere, DP will be a differential pressure device, e.g., a mechanical type differential pressure gauge at DP, which has high and low differential pressure inlet ports connected by line tubes A and B and appropriate couplings respectively to the top or output end of the probe P and to the fitting T.

The dial or other display of the differential pressure gauge DP is appropriately graduated and calibrated in terms of any suitable linear units of liquid level that is, the height of the liquid surface above the probe tip or above some other datum, e.g., where the probe does not reach substantially to the vessel bottom, for the particular liquid in question; or if desired, where the probe is intended for a particular vessel shape and contour, in terms of volume units for the liquid present.

Thus the scale may be non-linear in terms of volume where the cross section of the vessel be not constant over the various height contemplated for use. But in simplest form and for more universal use, with a given probe and gauge, the gauge may be simply graduated in terms of centimeters for the height of the liquid level above the probe end.

However, means or device DP may be considered as a schematic representation of the means for sensing the pressure differential and providing a read-out observable to the user whether this be a mechanical differential pressure gauge, or a differential pressure transducer of an electronic type and appropriate amplifier instrumentation, electronic or otherwise, providing an appropriate output signal and then a read-out device accepting the transducer output signal; either by way of a scale meter or, with further counting circuitry, a digital read-out. Also the triggering of a low level warning system, may be provided for in such electronic circuitry.

PROBE FORM OF FIG. 2

The probe P in the preferred form shown in FIG. 2, comprises a central, straight, small-bore, thermally conductive sensing tube 11, and insulating means 12 extending from the open bottom end 11a as the probe tip, over the by far greater length of the sensing tube 11, to leave the residual top portion 11a exposed for connection to a pressure tap or line and serving a further purpose to be described. Insulation means 12 includes a thin wall metal tube 13, preferably of a uniform diameter over its entire length excepting for a top portion 13a provided with a plurality (three as shown) of circumferential corrugations, which is joined through top and bottom end walls 14 and 15 respectively to the central tube in a sealed fashion to sustain vacuum between the tubes, and thereby serve as a vacuum insulating jacket for the central tube. A point of closure, by welding, soldering, or otherwise, of an exhausting port through which the jacket had been exhausted in manufacture is indicated at 16.

Appropriately for most cryogenic liquids sensing tube 11 is copper and jacket 13 is stainless steel.

The exterior of sensing tube 11, at least over its length portion within the jacket, is highly reflective, either by a high polish or by a suitable reflective metal plating, (e.g., nickel or chromium plating for example);

and preferably likewise the internal surface of the jacket tube 13 is similary highly reflective, as may be easily achieved for example where certain types of stainless steel are used for tube 13.

Cylindrical tube stock used for jacket tube may be simply formed inwardly at the ends and brazed or otherwise sealingly secured to the copper tube to produce the end walls 14, 15 or these may be separate annular disk elements of appropriate size and shape brazed in place between the tubes.

A slight exposure of the open bottom end of the tube 11, even with the open end flush with jacket end wall 14, provides the effective probe tip; but as indicated in FIG. 2A, the bottom end may project in a tip portion 11b notched or serrated to minimize further any remote possibility of tip occlusion by contact with a vessel bottom.

As a further insulating precaution, there are interposed at least at several axial locations about the sensor tube within the jacket, but preferably in end-to-end abutment for the full jacket length, a plurality of spacer sleeves 17 of any low-conductivity, preferably porous, material. For example, thin-sheet balsa wood sheathing stock simply wrapped around the sensor tube into edge-to-edge abutment with itself has proved an acceptable material for spacer element inserts 17. Filling the entire jacket length results in a probe structure which may be safely bent without tube contacts arising; a useful characteristic for some installations.

In this preferred arrangement, the corrugations 13a of the jacket wall in effect have an axially compressible and expansible bellows configuration which at least in some degree compensates for differences in the average thermal coefficients of linear metal expansion in the room to cryogenic temperature range for the sensing tube and the jacket, avoiding extreme stresses which might otherwise be developed, over the length of the probe assembly under extreme temperature change, say from normal room temperatures of 20C-25C to a very much lower temperature to which the probe is subjected when immersed for its intended use in a cryogenic liquid, such as liquid nitrogen at about −196° C.

Also the corrugation-surrounded end space of the jacket affords a convenient protected location for a small, very low wattage resistance heater unit 30, for which the appropriately insulated lead or supply conductor means at 34 are brought out the jacket end wall 15 through a vacuum-tight lead-through arrangement of known type, either for a single conductor where one electrical end of the resistance is grounded to 11 as one circuit side, else for two conductors.

Under some circumstances it may be desired to have the probe as such entirely within the confines of the vessel, though of course with the upper end above the maximum contemplated level. Under such conditions, part 11a would be in a chill nitrogen gas blanket, isolating it from room temperature. Then the necessary heat may be supplied by connecting the conductors to an appropriate source as described for FIG. 4.

PROBE FORM OF FIG. 3

The probe P in FIG. 3 is basically similar to that described for FIG. 2. Hence components or elements are designated by like or similar reference numerals or characters. The differences between the probes reside in or arise from basically the means utilized to compensate for the difference in thermal coefficients of linear expansion.

In FIG. 3, from top to bottom the jacket tube 13B is cylindrical. At room temperature conditions, as represented in FIG. 3, the copper sensor tube 11 by design is somewhat longer than the distance between the jacket end walls 14 and 15, resulting in slight curvatures of the tube at one or more locations, as indicated for example at one location 23. The length excess, in accordance with the higher coefficient of the copper tube as compared with that of the particular stainless steel, is so chosen that, upon probe immersion in the intended cryogenic liquid, the central tube, contracting more than the jacket tube, straightens out to a substantially coaxial relation to the jacket as indicated by the dash-dot lines 24 corresponding to the particular region 23 in FIG. 3.

Even where the jacket length is filled with balsa insulating spacing, the cellular character of the light balsa accommodates this distortion and shift of the central tube.

Thus one or the other of the central or jacket tubes, has at least at room temperature an excess running length, that is, as measured along the actual continuum of the metal, in other words, has a form distorted somewhat from rectilinear, sufficiently to accommodate the extremes, as between room temperatures and cryogenic use temperatures, to which the probe is to be subjected.

No concern need be given to dryness of residual air in the jacket since at the cryogenic temperatures of use, water vapor is frozen out, increasing the vacuum.

FIG. 4 MODIFICATION

In FIG. 4, a small resistance heating element 31, such as a resistance film deposited on an insulation layer or a wire coil, in heater unit 30, appropriately electrically and thermally insulated, may be placed on 11a to provide the heat input to 11, from a suitably controlled electrical energy source 33 by which the current to and hence heat developed at 31 is regulatable, the leads 34 conducting current to 31 having an appropriate form and insulation for the environment.

OPERATION

In using either the probe of FIG. 2 or that of FIG. 3, the mode of operation is identical. For example, consider the indicating and sensing device DP in FIG. 1 to be a sensitive ordinary mechanical type differential pressure gauge with the low pressure input port connected through line B and fitting T to the gas space G, and the high pressure port connected through line A to the top output end of the probe copper sensing tube. Shortly after insertion and chilling of the probe, due to vaporization, the central tube 11 has expelled therefrom all liquid nitrogen which might initially have entered. Thereafter, with the continual heat leakage from the atmosphere or environment outside the vessel cover cap into part 11a or introduced at 11a as described for FIG. 3 or 4, and thence downwardly to the copper tube bottom tip, the sensor tube bore is kept filled with nitrogen gas. Any liquid nitrogen tending to enter the tip is continually vaporized, and in effect there is a slow steady bubbling of nitrogen gas at the probe tip.

Thus each nitrogen bubble occluding the probe tip is in fact expanding against the total hydrostatic pressure represented by the gas pressure in G and the height of the liquid nitrogen above the tip, plus some small surface tension forces in the bubble.

However, inasmuch as the surface tension forces are of negligible effect on the measurement, they are considered absent; and, since the pressure prevailing in gas space G to act on the free liquid surface is applied to the differential pressure gauge, the gauge therefore senses the difference between the pressures. The gauge, in other words, is directly sensing and reading a pressure corresponding directly to the hydrostatic head or the liquid level height, and so may be calibrated in terms of level height for the particular liquid.

In situations where a liquid level is to be determined in a vessel which is not thus closed and pressurized, but the vapor of the cryogenic liquid is allowed to escape to atmosphere, the device DP then would still be a differential type of device with low pressure port merely open to the atmosphere, thus sensing and reading the gas pressure in the central tube 11 of the probe as against ambient pressure; or it may be a sensitive simple Bourdon type gauge with a single port connected to the probe.

Where the alarm system is triggered by a pressure switch Sw, rather than say a settable contact on a gauge needle and face as part of a relay system, the switch is simply set to respond at the pressure corresponding to that low level at which warning is desired. When that level is reached the warning device is activated to indicate the level condition to an equipment operator more emphatically than a mere continuous level indicating readout; and thereafter there continues to be a close indication of actual level. Thus, though utilization of the invention with either a continuous indicator or with a low level indicator has distinct advantages over prior analogous arrangements, the combination is especially advantageous as above described.

From the above description and the drawings, wherein for clarity, the size proportions of parts are not preserved, the simplicity of the probe structure and fabrication and operation is readily apparent. A vacuum of 1 mm Hg was found to be sufficiently low for an effective liquid nitrogen operation of a probe as in FIG. 2, which had a total length of 21½ inches (55 cm), comprised of a soft copper tube with 0.081 inch (2.06 mm) outside diameter and 0.025 inch (0.64 mm) wall thickness, with part 11a projecting ⅛ inch (3 mm) for a heat input surface from ambient atmosphere and to afford a 10–32 connection thread; and a jacket tube of 304 stainless steel alloy, 3/16 inch (4.8 mm) in outside diameter and 0.010 inch (0.25 mm) wall thickness, using 1 inch (2.5 cm) long spacers 17 of balsa wood inserted in end-to-end abutment substantially to fill the length of tube 11; and the bottom of tube 11 being flush with end wall 14. Less than 100 ml per day of liquid nitrogen was found to be the comsumption rate for this probe.

It may be further noted that for facility in manufacturing probes suitable for many applications, a jacket tube need not be exhausted to low vacuum at room temperature. Thus the jacket space may be purged by introducing a small amount of water turned into steam, or by a carbon dioxide gas fill, and then in either case immediate sealing. In the case of the water, the steam generated serves to purge the tube as well as a carbon dioxide fill just before sealing without any specific evacuation being carried out by vacuum pumping. In such cases, at room temperature there would be a considerable vapor pressure of water or carbon dioxide, although the sealed jacket tube might by notably below atmospheric pressure upon cooling and condensation of the steam after sealing; or in the case of the carbon dioxide filling or purgings, the internal pressure would indeed approach atmosphere pressure. However, upon probe immersion and use in a cryogenic liquid, the condensation of any vapor to a liquid form, even freezing in the case of water, or of air itself (though originally at 1 atmosphere) for a probe in liquid helium, will result in fact in a high vacuum quite sufficient for insulating purposes under the conditions of actual use.

It may be noted that available special low temperature layer insulation materials, which drastically reduce radiative heat transfer, may be used in the cylindrically annular vacuum space of probes, for example, instead of balsa at 17. Thus plastic film on the thickness order of 1 mil or less and having a very thin, highly reflective deposited metal layer is available commercially for this purpose, e.g., "Mylar" film with a much thinner vacuum deposited aluminum layer. Two or more turns of such material wound with metal side out is easily accommodated about the sensor tube in the vacuum jacket space of probes previously described to provide a highly effective radiant heat barrier, replacing if desired, the high polish or reflective plating previously described. Though spacers of balsa or other insulating stock may be interposed between this wound tubular barrier structure and the external jacketing wall, the barrier itself may afford some degree of spacing function to the extent that it prevents contact of the two tubes upon deflection or deformation arising by intentional bending, or thermal or accidental mechanical stresses.

Since conduction of heat to the tip of the hydrostatic pressure probe i.e., to the pressure sensing point is of prime importance to ensure that any liquid entering the probe tip is vaporized, other modifications of the probe aspects of the invention are feasible.

In general, various systems and probes may be used to carry out the basic method, which comprises inserting a tubular structure providing a sensor tube bore insulated from the liquid body; feeding heat, by a path thermally insulated from the liquid body, along the sensor tube bore to the open bore tip, (which may be termed in a sense a bore input opening), with a heat input rate sufficient to evaporate any liquid entering the bore and to maintain the bore clear of the liquid as a stable condition; and measuring the gas pressure at a second or output opening remote from the tip, while that stable condition is maintained.

Though small diameter probes are usually desired, there is no specific limit on probe diameter size insofar as operability is concerned. Other metals than copper may be used for the heat path depending upon the particular situation, e.g., aluminum, silver, gold.

FIG. 5 PROBE

Thus for the probe form of FIG. 5, a length 40 of thinwalled stainless steel vacuum jacketed piping, commercially available for use with cryogenic liquids, by its jacketed or internal wall tubing element 41, ordinarily used as a liquid conduit, affords in a commercially available unit the pressure sensing tube and the integral jacket 42. At its upper end this unit may be directly connected to the corresponding pressure sensing external devices by connecting means 43. A thin copper wire 44 is supported coaxially in 41 by end-anchoring perforated support disks 45 and 46 bonded on the ends of unit 40 with appropriate loose fitting spacer beads strung on the wire if desired, the bead material having low thermal conductivity. The upwardly projecting wire end 44a serves as the heat input point. In simplest form, the top end of the double-walled tube unit 40 may be inserted directly into a stiff elastomeric pressure connecting lead tube as 43, i.e., at the end of pressure line A in FIG. 1; in which case, for example, the wire at 44a as a heat input region may simply be carried some distance into and entirely within the tube 43; which itself being surrounded by ambient atmosphere will not preclude this purpose.

PROBES OF FIGS. 6-6A

Furthermore, as in FIG. 6, a thin-wall stainless steel vacuum jacketed pipe 40 of the type described again may itself, by virtue of its vacuum insulated inside wall tube 41, provide the gas sensing tube, with the heat transfer path provided by a layer 48 of highly conductive material, such as copper, silver or gold. Thus a heavy internal copper layer or coating 48 may be plated on the internal surface tube wall over its full length. If then the jacketed tube unit 40 itself projects inwardly well away from the cryogenic liquid into ambient atmosphere, heat reaching the copper in that region will be quickly transferred along the highly conductive copper layer, as contasted with low heat conduction of the thin-wall stainless tubing, to conduct the heat to the probe tip, but without resulting in any appreciable or troublesome transmission of heat to the probe-surrounding body of liquid nitrogen as such.

The comparatively high thermal resistance offered by the thin wall tube, as well as the vacuum insulation provided in this arrangement enable this approach with a copper plating. Further if desired, a thermal contact may be made at the top with the copper layer, by a copper extension element projecting in sealed relation through a pressure lead 43 as in FIG. 5 into the ambient atmosphere or to a point intended for a positive direct application of heat.

With two coaxial tubes as in FIG. 6A, the highly conductive coating or layer may be used on the outer surface of a thin wall metal inner tube, especially with a flashing layer 48d, e.g., of copper. The copper "pipes" the heat to the tip, but as well there is again distribution, by a "leakage" radially through the thin wall into the bore over the length of the inner tube. For liquid helium service, between the tubes some turns 17a of the aluminined Mylar are used, or alternately deposited thin layers of a polymer and of reflective metal, e.g., Aluminum, a few atoms thick.

FIG. 7 PROBE

Similarly in FIG. 7 with a jacketed tube 40 of the described thin-wall stainless steel type, a plastic insulated loose stranded copper or aluminum wire 50, even an ordinary stranded electric wire, may be inserted into the central tube 41, with the continuous plastic insulation 50a providing the sensor tube, and the loose strands 50b providing the heat path, for the strands will not occlude the insulation as a sensor tube. Then for the wire strands 50b, the insulation is a spacer with respect to the surrounding jacket internal wall.

In this case either the inner tube or the outer jacket may be connected as in FIG. 5 to a pressure tap, or if desired even the plastic insulation tubing 50a of the wire itself may serve as the pressure sensor tube, as long as its inner end is established at a definite point in the vessel. Aluminum stranded wire may also serve this purpose.

On the other hand, with a thin wall stainless steel jacket 40 of the type described serving purely for insulation purposes, a plastic tube with bottom end at predetermined level as the probe tip may itself be carried directly to an instrument pressure tap, and one, two, or three strands of copper wire retained therein may be carried out beyond the top end of the jacket to a level exposed, in effect, to ambient atmosphere for heat transfer though surrounded by plastic tubing. Such structure substantially abates the problem of differential expansion or contraction.

For this purpose, the wire may be carried into the connecting tubing, as far as required, to enable sufficient heat transfer despite the surrounding tube of plastic.

Also if desired, the projecting end of the wire in any of these forms may be inductively heated as in FIG. 8 by a high frequency energized coil surrounding the plastic tube above the end of the jacket tube.

In some situations, the plastic tube providing the wire insulation (even of commercial stranded electric wire) may itself be adequate insulation with respect to the surrounding body of liquid and has then the dual functions of sensor tube and insulation. Advantageously, since verticality is not required, this affords a flexible structure for easy initial installation over a tortuous path in awkward physical environments.

In the foregoing forms where a plastic sensor tube is inserted in the jacket pipe, the plastic at least at some point, preferably at the top, is circumferentially sealed to the inner wall of the jacket pipe, to minimize upward creep and loss of nitrogen by evaporation between plastic and pipe, e.g., at 50s in FIG. 7, as by an adhesive bond. However, if the pressure line connection is made as at 43 in FIG. 5, this seal is unneeded.

For a given thermally conductive path disposition and material, assuming uniformity of cross section is used for simplicity of manufacture, the minimum cross section to be used will depend upon the length of the path along which heat is to be dissipated, the outward thermal leakage, and the temperature at the thermal input points, as well as the heat flux be delivered to the tip. Thus in some instances, a ½ mil copper plate was found sufficient on the inner face of a 3/16 inch stainless steel tube with 0.010 wall.

ORIGINAL EQUIPMENT INSTALLATION - FIG. 8

In original equipment design, the probe may in effect be brought in through wall structure of the vessel in question, especially a sidewall or even bottom wall, either through appropriate insulating fittings or by welding to the outer wall of the vacuum jacketed probe P.

Fragmentary schematic FIG. 8 illustrates the arrangement where a vacuum jacketed vessel Fa has inner wall 61, outer wall 62 with the space therebetween evacuated; and the probe Ps in a disposition somewhat inverted from prior arrangements to enter the vessel through the bottom. Though the probe may take various forms, such as those previously described with appropriate vessel wall penetrating structure, in FIG. 8 where again for clarity and convenience of representation the size proportions are not preserved, the vessel bottom wall has a small diameter port tube 63 carried through the vacuum jacket space, in which is secured a short form probe Ps.

Probe Ps is comprised of a close-fitting thermally insulating plastic tube 65 with an outer end seal flange 65f received over bottom studs 66 into sealing relation against the bottom wall 62; and a short sensor tube 67 of copper or the like fitted tightly in the plastic tube, having its inner end straight and flush with the vessel interior bottom where the bore is quite small, otherwise preferably turned in a U-bend 67u back toward, and with end near, the bottom.

At a small sensor tube flange 67f, a thermally insulating washer 68 and a clamping ring 69 received over the studs 66 for sealing clamping securement by nuts and thrust washers 70, secure the probe assembly in sealed clamped relation to the tank bottom.

On the projecting bottom end of the probe, a liquid nitrogen type plug valve 71 or equivalent is provided for safety and maintenance purposes, just above the gauge line connection end 67f. The projecting probe part 67p affords a locus for heat input from ambient atmosphere alone or by a surrounding RF-energized induction heating coil 72.

If valve 71 is to be not connectable to 67 after installation of the prior elements, but rigidly in place on 67, split ring forms for 68 and 69 will be indicated.

With the U-bend 67u and the outside diameter of sleeve 65 proportioned relative to each other, and perhaps non-coaxially disposed for the purpose, so that a sub-assembly of 65-67 may be inserted into 63, the depicted threaded connection of the U at 67t may be omitted.

In FIG. 8, the tube bore section at the point where the tube emerges from the insulating plastic sleeve or bushing 65 may be considered the input opening to the sensor tube bore. Moreover, the inside plated sensor tube form of 41 and 48 appearing in FIG. 6, with 41 comprised of a low conductivity stainless steel or other metal and 48 a high conductivity plating, may be used for the entire sensor tube 67, or for the U-bend portion alone. The relatively low conductivity material in 41 then in effect offers a degree of thermal insulation to the tubular plating 48. When no other considerations interdict, the clamping and mounting structure for the assembly may be located on the top surface of the inside wall 61.

We claim:

1. Apparatus for determining liquid level in a vessel containing a cryogenic liquid or other volatile liquid comprising:
   a probe immersed in the liquid including means forming a tubular space
      open at its bottom end as a probe tip located at a datum above which it is desired to measure liquid free surface level heights and
      a tubular space upper portion extending above the height of any liquid level contemplated; and
   level response means
      including pressure sensing means
         connected to the upper portion of the tubular space and
         adapted to sense continually the amount by which a gas in said tubular space exceeds pressure acting on the liquid surface,
   said level response means being adapted to provide an indication of the occurrence of at least one level within the level range of the probe;
   said probe comprising
      as the first said means a sensor tube constituted of metal having a high thermal conductivity and with the bore thereof providing said tubular space,
      insulating means about said tube isolating said tube from contact with the liquid and thermally insulating said tube with respect to the liquid, except at an exposed probe tip, and
      means for introducing heat at the top end of the insulated portion of the tube and conducting it to said tubular space as far as said tip,
         said means including an uninsulated extension of the sensor tube;
      whereby said tube affords an insulated heat pipe to the tube bore and tip, substantially within the tubular space above the probe tip, so that the pressure prevailing in said tubular space corresponds substantially to the hydrostatic head of the liquid above said tip plus pressure of a gas phase acting on the liquid free surface.

2. A probe apparatus as described in claim 1, in combination with electrically energized means providing heat to said path.

3. The combination of claim 2, wherein said electrically energized means is an induction heating device.

4. Apparatus as described in claim 1, wherein said level response means includes a pressure-sensitive low-level alarm switch and an alarm device activated by said switch.

5. Apparatus as described in claim 1, wherein said level response means includes an indicating device actuated by said sensing means and calibrated in terms of liquid head and thereby the height of liquid to be determined, to provide a continuous read-out of the actually prevailing liquid level.

6. Apparatus as described in claim 1, wherein the probe is disposed in the vessel with the uninsulated portion of the tube in a region of exposure to ambient atmosphere or room temperature, whereby heat supplied to the probe is received from the ambient atmosphere.

7. Apparatus as described in claim 1, wherein the said means for supplying heat further includes an electrical resistance heater on a portion of the sensor tube adjacent the upper end of the insulation means; and electric circuit means supply a regulated current to the heater.

8. Apparatus as described in claim 1, wherein said vessel is a closed vessel, and
   said probe has an uninsulated tube portion extending through a vessel top closure for exposure to ambient atmosphere and for connection to said pressure sensing means;
   said pressure sensing means comprising a differential pressure sensing device with a high pressure input port connected to the top end of said tube and a low pressure input port connected to the gas space in said vessel above the liquid level.

9. Apparatus as described in claim 1, wherein
   said insulating means comprises an external, thin-walled metal tube coaxially surrounding and spaced from said sensor tube,
   said external tube extending substantially from the bottom tip of the sensor tube up its length to at least the height of liquid levels intended to be determined,
   said external tube as a jacket tube having top and bottom ends sealed to the sensor tube, the space between said external tube and sensor tube being evacuated to form a vacuum jacket.

10. Apparatus as described in claim 9, with low thermal conductivity spacer sleeve means interposed between the said sensor and jacket tubes.

11. Apparatus as described in claim 9, wherein the tubes are constituted of respective metals having different average thermal coefficients of linear expansion over the temperature range between room temperatures and temperatures of intended probe use;
    one of said tubes is distorted along its length from straight form to provide at least at normal room temperatures different running lengths of metal in the tubes between the points of attachment of the tubes to each other to accommodate difference in expansion and contraction between said points of attachment.

12. Apparatus as described in claim 11, wherein said sensor tube is a copper tube substantially straight at room temperatures, and
    said jacket tube is a stainless steel tube having, adjacent its upper locus of attachment to the sensor tube, a plurality of circumferential corrugations, providing said excess length as a means of compensating for differences in said average thermal coefficients of linear expansion of the two metals.

13. Apparatus as described in claim 11, wherein the jacket tube has a substantially straight cylindrical shape, and is comprised of a metal having a lower average linear thermal coefficient of expansion than that of the sensor tube over the temperature range between normal room temperatures and the temperature of cryogenic liquid in which the probe is to operate; and
    the sensor tube at room temperature has a length between points of tube attachments greater than the jacket tube length and in at least one location within the jacket is deflected from co-linearity.

14. A probe for use in apparatus as described in claim 1, comprising:
    a small-bore thermally conductive tube as a senor tube, insulating means about said tube isolating said tube from contact with the liquid and thermally insulating said tube with respect to the liquid, except at an exposed probe tip;
    said insulating means comprising an external, thin-walled metal tube coaxially surrounding and spaced from said sensor tube,
    said external tube extending substantially from the bottom tip of the sensor tube up its length to at least the height of liquid levels intended to be determined,
    said external tube as a jacket tube having top and bottom ends sealed to the sensor tube, and
    the space between said external tube and sensor tube being evacuated for form a vacuum jacket; and
    means for introducing heat to the top end of the insulated portion of the tube,
    including an uninsulated extension of the sensor tube, said tube affording an insulated heat pipe to the tube bore and tip, thereby substantially to prevent condensation and accumulation of the liquid within the tube above the probe tip, so that the pressure prevailing in said tube corresponds substantially to the hydrostatic head of the liquid above said tip plus pressure of a gas phase acting on the liquid free surface;
    whereby the height of liquid above the tip may be read on a pressure-measuring device calibrated in terms of head of the liquid to be observed.

15. A probe as described in claim 14, with low thermal conductivity spacer sleeve means interposed between the said sensor jacket tubes.

16. A probe as described in claim 14, wherein the tubes are constituted of respective metals having different average thermal coefficients of linear expansion, over the temperature range between room temperatures and temperatures of intended probe use;
    one of said tubes is distorted along its length from straight form to provide at least at normal room temperatures different running lengths of metal in the tubes between the points of attachment of the tubes to each other to accommodate difference in expansion and contraction between said points of attachment.

17. A probe as described in claim 16, wherein said sensor tube is a copper tube substantially straight at room temperature, and
    said jacket tube is a stainless steel tube having, adjacent its upper locus of attachment to the sensor tube, a plurality of circumferential corrugations, providing said excess length as a means of compensating for differences in said average thermal coefficients of linear expansion of the two metals.

18. A probe as described in claim 16, wherein the jacket tube has a substantially straight cylindrical shape, and is comprised of a metal having the lower average linear thermal coefficient of expansion; and
    the sensor tube at room temperature has a length between points of tube attachments greater than the jacket tube length and in at least one location within the jacket is deflected from co-linearity.

19. A probe as described in claim 14, wherein the said means for supplying heat further includes an electrical resistance heater on the extension of the sensor tube with the top end of the jacket; and
    electric circuit means supply a regulated current to the heater.

20. A probe apparatus for use in carrying out the measuring of static liquid pressure comprising:
    a tubular structure providing a probe sensor tube affording a tube bore thermally insulated from the body of the liquid except at the next-mentioned input opening and having opposite end regions provided respectively with an input opening to and an output opening from the tube bore,
    said structure enabling the input opening to be located at said point and enabling a connection of the output opening to an input of a fluid pressure responsive device;
    means providing a heat path, thermally insulated from the body of the liquid, to the sensor tube bore up to the input opening, for a heat input rate sufficient to evaporate in the bore, and to maintain said bore clear of, said liquid; and
    means on the probe affording a connection point for connecting the output opening of the bore to a said fluid pressure responsive device;
    thermal insulation for said sensor tube bore being provided by an outer jacket tube coaxially disposed about, and at its ends joined to, said sensor tube to enclose a lower pressure or vacuum space under conditions of use of the probe;

said sensor tube being comprised of material of high thermal conductivity thereby to provide said heat path.

21. A probe apparatus as described in claim 20, having, in the annularly cylindrical space between said tubes, radiative heat transfer inhibiting reflective material surrounding the sensor tube.

22. A probe apparatus as described in claim 20, wherein said outer tube includes, as a portion of its length, a circumferentially corrugated formation to accommodate relative length changes due to differences between the tubes in average thermal coefficients of expansion.

23. A probe apparatus as described in claim 20, wherein the portion of the sensor tube having said output opening is extended beyond a thermally insulated portion as said means to afford the connection point.

24. A probe apparatus as described in claim 20, wherein an end portion of the outer jacket tube, adjacent said output opening, provides the said means affording the connection point.

25. A probe apparatus for use in carrying out the measuring of static liquid pressure comprising:

a tubular structure providing a probe sensor tube affording a tube bore thermally insulated from the body of the liquid except at the next-mentioned input opening and having opposite end regions provided respectively with an input opening to and an output opening from the tube bore, said structure enabling the input opening to be located at said point and enabling a connection of the output opening to an input of a fluid pressure responsive device;

means providing a heat path, thermally insulated from the body of the liquid, to the sensor tube bore up to the input opening, for a heat input rate sufficient to evaporate in the bore, and to maintain said bore clear of, said liquid; and means on the probe affording a connection point for connecting the output opening of the bore to a said fluid pressure responsive device;

thermal insulation of said sensor tube bore being provided by an outer jacket tube coaxially disposed about, and at its ends joined to, said sensor tube to enclose a lower pressure or vacuum space under conditions of use of the probe;

said sensor tube being provided with a coated or plated layer of material having a high thermal conductivity over a length corresponding to the length of said bore.

26. A probe apparatus as described in claim 25, wherein said layer is disposed on the bore-defining inner surface of said sensor tube.

27. A probe apparatus for use in carrying out the measuring of static liquid pressure comprising:

a tubular structure providing a probe sensor tube affording a tube bore thermally insulated from the body of the liquid except at the next-mentioned input opening and having opposite end regions provided respectively with an input opening to and an output opening from the tube bore, said structure enabling the input opening to be located at said point and enabling a connection of the output opening to an input of a fluid pressure responsive device;

means providing a heat path, thermally insulated from the body of the liquid, to the sensor tube bore up to the input opening, for a heat input rate sufficient to evaporate in the bore, and to maintain said bore clear of, said liquid; and means on the probe affording a connection point for connecting the output opening of the bore to a said fluid pressure responsive device;

thermal insulation for said sensor tube bore being provided by a vacuum jacket about the sensor tube;

said vacuum jacket being provided by a thin-walled inner metal tube and a thin-walled outer metal tube joined at opposite ends of the outer tube to define a vacuum space;

said sensor tube being a plastic tube extending through the length of the inner tube; and said heat path being provided by at least one strand of material of high thermal conductivity running from the input opening of the plastic tube at one end of the jacket at least to a location at the other end of the jacket.

28. A probe apparatus for use in carrying out the measuring of static liquid pressure comprising:

a tubular structure providing a probe sensor tube affording a tube bore thermally insulated from the body of the liquid except at the next-mentioned input opening and having opposite end regions provided respectively with an input opening to and an output opening from the tube bore, said structure enabling the input opening to be located at said point and enabling a connection of the output opening of an input of a fluid pressure responsive device;

means providing a heat path, thermally insulated from the body of the liquid, to the sensor tube bore up to the input opening, for a heat input rate sufficient to evaporate in the bore, and to maintain said bore clear of, said liquid; and means on the probe affording a connection point for connecting the output opening of the bore to a said fluid pressure responsive device;

thermal insulation for said sensor tube bore being provided by a vacuum jacket about the sensor tube;

the said input opening being provided in an end portion of the sensor tube projecting beyond the jacket and the projecting end portion being notched.

29. A probe apparatus for use in carrying out the measuring of static liquid pressure and adapted for installation in a port through a bottom or side-wall of a vessel, the port being the point above which liquid level is to be determined, and comprising:

a tubular structure providing a probe sensor tube affording a tube bore thermally insulated from the body of the liquid except at the next-mentioned input opening and having opposite end regions provided respectively with an input opening to and an output opening from the tube bore, said structure enabling the input opening to be located at said point and enabling a connection of the output opening to an input of a fluid pressure responsive device;

means providing a heat path, thermally insulated from the body of the liquid, to the sensor tube bore up to the input opening, for a heat input rate sufficient to evaporate in the bore, and to maintain said bore clear of, said liquid; means on the probe affording a connection point for connecting the output opening of the bore to a said fluid pressure responsive device;

an insulating sleeve extending through said port and having a flange;
said sensor tube being fitted in and extending through said sleeve whereby the sleeve affords thermal insulation to the sensor tube bore;
said sensor tube being comprised of metal thereby to provide said heat path;
the bore at the inner end of the sensor tube serving as the input opening, and the sensor tube bore at the outer end of the sleeve affording the output opening;
an extension of the metal tube beyond the sleeve providing said means affording the connection point; and
means for clamping the sleeve and tube to each other and to the vessel region of said port in a fluid-tight joint.

30. A probe apparatus as described in claim 29, wherein said extension affords a heat input region for said heat path.

* * * * *